US010557996B2

(12) United States Patent
Lu et al.

(10) Patent No.: US 10,557,996 B2
(45) Date of Patent: Feb. 11, 2020

(54) END FACE PROTECTION TAPE FOR FIBER OPTIC CONNECTOR; AND METHODS

(71) Applicant: CommScope Technologies LLC, Hickory, NC (US)

(72) Inventors: Yu Lu, Eden Prairie, MN (US); Giorgio Policante, Steensel (NL); Thomas Seifert, Jordan, MN (US); Paul Schneider, Gemonde (NL)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/764,219

(22) PCT Filed: Sep. 22, 2016

(86) PCT No.: PCT/US2016/053053
§ 371 (c)(1),
(2) Date: Mar. 28, 2018

(87) PCT Pub. No.: WO2017/058629
PCT Pub. Date: Apr. 6, 2017

(65) Prior Publication Data
US 2018/0284358 A1 Oct. 4, 2018

Related U.S. Application Data

(60) Provisional application No. 62/233,754, filed on Sep. 28, 2015.

(51) Int. Cl.
*G02B 6/38* (2006.01)
*B08B 7/00* (2006.01)

(52) U.S. Cl.
CPC .......... *G02B 6/3849* (2013.01); *B08B 7/0028* (2013.01); *G02B 6/385* (2013.01);
(Continued)

(58) Field of Classification Search
CPC .... G02B 6/3849; G02B 6/385; G02B 6/3882; G02B 6/3885; G02B 6/3863
(Continued)

(56) References Cited

U.S. PATENT DOCUMENTS 4,708,432 A 11/1987 Berg
5,202,949 A 4/1993 Hileman et al.
(Continued)

FOREIGN PATENT DOCUMENTS

EP 2 159 612 A1 3/2010
JP H03-175406 A 7/1991
(Continued)

OTHER PUBLICATIONS

International Search Report and Written Opinion of the International Searching Authority for International Patent Application No. PCT/US2016/053053 dated Nov. 30, 2016, 11 pages.
(Continued)

*Primary Examiner* — Jerry M Blevins
(74) *Attorney, Agent, or Firm* — Merchant & Gould P.C.

(57) ABSTRACT

Aspects and techniques of the present disclosure relate to a fiber optic connector assembly including a fiber optic connector with a front end and a back end. A ferrule positioned at the front end. The ferrule has a distal end face with a central region and recessed regions on opposite sides of the central region. The assembly includes a dust cap mounted on the ferrule. The dust cap has an open end and an opposite closed end. The fiber optic connector assembly also includes a tape member that covers the central region of the ferrule. The tape member can be secured to the dust cap such that when the dust cap is removed, the tape member simultaneously comes off with the dust cap.

8 Claims, 8 Drawing Sheets

(52) U.S. Cl.
CPC ......... *G02B 6/3866* (2013.01); *G02B 6/3882* (2013.01); *G02B 6/3885* (2013.01); *G02B 6/3863* (2013.01)

(58) Field of Classification Search
USPC .......................................................... 385/78
See application file for complete search history.

(56) References Cited

U.S. PATENT DOCUMENTS

| | | | |
|---|---|---|---|
| 5,214,730 A | 5/1993 | Nagasawa et al. | |
| 5,400,060 A | 3/1995 | Carlotta | |
| 6,547,444 B2 | 4/2003 | Kiani | |
| 6,579,014 B2 | 6/2003 | Melton et al. | |
| 6,623,174 B2 | 9/2003 | Perko et al. | |
| 6,634,732 B2 | 10/2003 | Farr et al. | |
| 6,648,520 B2 | 11/2003 | McDonald et al. | |
| 6,715,467 B2 | 4/2004 | Nelson et al. | |
| 6,899,467 B2 | 5/2005 | McDonald et al. | |
| 6,957,920 B2 | 10/2005 | Luther et al. | |
| 6,986,607 B2 | 1/2006 | Roth et al. | |
| 7,588,375 B2 | 9/2009 | Hovland et al. | |
| 7,824,109 B2 | 11/2010 | Tanaka et al. | |
| 7,985,461 B2 | 7/2011 | Hashimoto et al. | |
| 8,251,592 B2 | 8/2012 | Wu | |
| 8,330,944 B2 | 12/2012 | Liu et al. | |
| 8,594,479 B2 | 11/2013 | Liu et al. | |
| 8,705,931 B2 | 4/2014 | Liu et al. | |
| 8,740,474 B2 | 6/2014 | Lu et al. | |
| 8,998,503 B2 | 4/2015 | Barnette, Jr. et al. | |
| 9,207,407 B2 | 12/2015 | Barnette, Jr. et al. | |
| 9,411,110 B2 | 8/2016 | Barnette, Jr. et al. | |
| 2003/0002815 A1 | 1/2003 | Tanaka et al. | |
| 2005/0286853 A1 | 12/2005 | Fjukiwara et al. | |
| 2007/0230874 A1 | 10/2007 | Lin | |
| 2008/0034519 A1 | 2/2008 | Fujiwara | |
| 2008/0152284 A1 | 6/2008 | Lytle et al. | |
| 2008/0298749 A1 | 12/2008 | Hovland et al. | |
| 2010/0086715 A1* | 4/2010 | Katou | B32B 27/08 428/35.7 |
| 2011/0229088 A1 | 9/2011 | Isenhour et al. | |
| 2011/0297184 A1 | 12/2011 | Mahaptra et al. | |
| 2012/0141071 A1 | 6/2012 | Duis et al. | |
| 2013/0308909 A1 | 11/2013 | Barnette, Jr. et al. | |
| 2014/0124140 A1 | 5/2014 | Verheyden et al. | |
| 2015/0063759 A1 | 3/2015 | Barnette, Jr. et al. | |
| 2015/0241639 A1 | 8/2015 | Lu et al. | |

FOREIGN PATENT DOCUMENTS

| | | | |
|---|---|---|---|
| JP | H08-211235 A | 8/1996 | |
| JP | 2000-304949 A | 11/2000 | |
| JP | 2005-202224 A | 7/2005 | |
| WO | 2009/040565 A1 | 4/2009 | |
| WO | 2011/047002 A1 | 4/2011 | |
| WO | 2012/112343 A1 | 8/2012 | |
| WO | 2015/017170 A1 | 2/2015 | |
| WO | WO-2015017170 A1 * | 2/2015 | ........... G02B 6/3849 |

OTHER PUBLICATIONS

Extended European Search Report for European Patent Application No. 16852336.3 dated Jul. 29, 2019, 12 pages.
Partial Supplementary European Search Report for European Patent Application No. 16852336.3 dated Apr. 20, 2019, 13 pages.

* cited by examiner

END FACE PROTECTION TAPE FOR FIBER OPTIC CONNECTOR; AND METHODS

CROSS-REFERENCE TO RELATED APPLICATION

This application is a U.S. National Stage Application of PCT/US2016/053053, filed on Sep. 22, 2016, which claims the benefit of U.S. Patent Application Ser. No. 62/233,754, filed on Sep. 28, 2015, the disclosures of which are incorporated herein by reference in their entireties. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems. The present disclosure also relates to a system for inspecting fiber-optic endfaces in multi-fiber connectors within an apparatus including a microscope therein.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical fiber optic connector includes a ferrule assembly supported at a distal end of a connector housing. The ferrule assembly can include a multi-fiber ferrule mounted in a hub. A spring is used to bias the ferrule assembly in a distal direction relative to the connector housing. The multi-fiber ferrule functions to support the end portions of multiple optical fibers. The multi-fiber ferrule has a distal end face at which polished ends of the optical fibers are located. When two multi-fiber fiber optic connectors are interconnected, the distal end faces of the multi-fiber ferrules oppose and are biased toward one another by their respective springs. With the multi-fiber fiber optic connectors connected, their respective optical fibers are coaxially aligned such that the end faces of the optical fibers directly oppose one another. In this way, optical signals can be transmitted from optical fiber to optical fiber through the aligned end faces of the optical fibers.

As indicated above, multi-fiber ferrules are configured for supporting the ends of multiple optical fibers. Typically, the optical fibers are arranged in one or more rows within the multi-fiber ferrule. When two multi-fiber ferrules are interconnected, the fibers of the rows of optical fibers align with one another. For most multi-fiber ferrules, it is desirable for the optical fibers to protrude distally outwardly from the distal end faces of the multi-fiber ferrules. This type of protrusion can assist in making physical fiber-to-fiber contact when two multi-fiber connectors are mated. U.S. Pat. No. 6,957,920, which is hereby incorporated by reference in its entirety, discloses a multi-fiber ferrule having protruding optical fibers of the type described above.

Contamination and defects on the end face of a fiber optical connector is a major concern that can degrade the performance of the connector. For example, small scratches (e.g., on the order of micro-meters) and dust particles can greatly impact the performance of the connector. Accordingly, connectors are often transported and stored with end caps or dust covers that are designed to shield the end face of the connector ferrule. However, even with a dust cover, connectors may still become contaminated with particulates or become scratched. For example, particles from the interior of the dust cap may migrate to the end face of the ferrule of the connector.

While structures such as dust caps have been used in the prior art to protect the polished end faces of optical fibers, improvements are desirable in this area.

SUMMARY

One aspect of the present disclosure relates to a fiber optic connector. The fiber optic connector can include a fiber optic connector having a connector body with a front end and a back end. A ferrule can be positioned at the front end of the connector body. The ferrule may have a distal end face with a central region and recessed regions on opposite sides of the central region. The ferrule can hold an optical fiber that has a polished end face positioned at the central region of the distal end face of the ferrule. The fiber optic connector can also include a dust cap mounted on the ferrule. The dust cap can have an open end and an opposite closed end such that the closed end of the dust cap opposes the polished end face of the optical fiber. The fiber optic connector can also include a tape member that covers the central region of the ferrule. The tape member can be secured to the dust cap such that when the dust cap is removed, the tape member simultaneously comes off with the dust cap.

Another aspect of the present disclosure relates to fiber optic assembly that can include a fiber optic connector with a ferrule. The ferrule can support an optical fiber extending therethrough to a distal end face of the ferrule. A dust cap can be mounted on the ferrule where the dust cap can have an open end and an opposite closed end. The closed end can oppose the distal end face of the ferrule. A tape cover can be adhered directly to the distal end face of the ferrule. The tape cover can be connected to the dust cap such that the tape cover is simultaneously released with the dust cap as the dust cap is removed.

A further aspect of the present disclosure relates to an apparatus for applying protective sheeting on an end face of a ferrule. The apparatus can include an inspection device that includes a housing. The housing may limit access of loose particles of dust and debris within it. An integrated tape dispenser can be located within the housing of the inspection device and the integrated tape dispenser can apply a tape member to the end face of the ferrule while within the housing.

Another aspect of the present disclosure relates to a method of applying a tape member to an end face of a ferrule connector positioned inside a housing of an inspection device. The housing of the inspection device can include an integrated tape dispensing mechanism. The method can include the steps of inspecting an end face of the ferrule connector within the housing of the inspection device; and applying the tape member over the end face of the ferrule connector within the housing of the inspection device.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

The present disclosure relates generally to a process for applying tape to an end face of a ferrule connector right after it has been inspected as clean. The present disclosure incorporates a tape application station inside of a housing of a microscope so that the inspection of the end face of the ferrule connector and the application of the tape to the end face of the ferrule connector can both occur within the housing in a generally contaminated free area.

Fiber optic connectors can include ferrules supporting single optical fibers (i.e., single-fiber ferrules corresponding to single-fiber connectors) and can also include ferrules supporting multiple optical fibers (i.e., multiple-fiber ferrules corresponding to multiple-fiber connectors). One example of an existing single-fiber fiber optic connection system is described at U.S. Pat. Nos. 6,579,014; 6,648,520; and 6,899,467, which are hereby incorporated by reference in their entireties. An example of a multi-fiber connection system is disclosed at U.S. Pat. No. 5,214,730, the disclosure of which is hereby incorporated herein by reference in its entirety.

Figure 1:
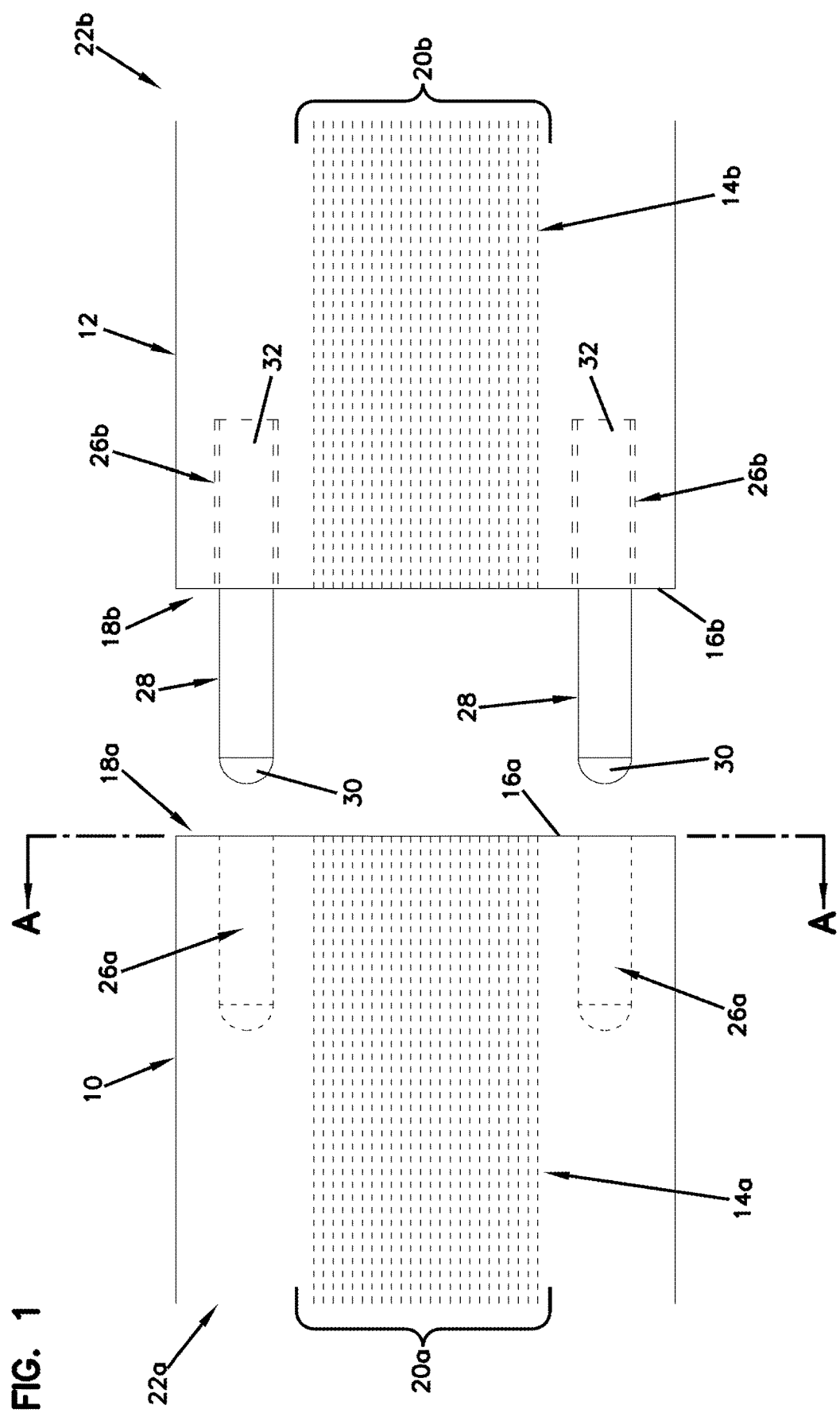
FIG. 1 is a cross-sectional top view of a pair of multi-fiber optic ferrules in accordance with the principles of the present disclosure.

FIG. 1 illustrates an example female ferrule 10 and a male ferrule 12 adapted to be coupled together. When the ferrules 10, 12 are coupled together (i.e., mated) optical fibers supported by the female ferrule 10 are optically coupled to corresponding optical fibers supported by the male ferrule 12.

In some aspects, the female ferrule 10 and the male ferrule 12 each may include a contact face 16a, 16b at a front end 18a, 18b of the ferrules 10, 12. In some implementations, the female ferrule 10 and the male ferrule 12 may each define fiber passages 20a, 20b that extend through a depth of the female and male ferrules 10, 12 from a rear end 22a, 22b of the female and male ferrules 10, 12 to the front end 18a, 18b of the female and male ferrules 10, 12.

Figure 2:
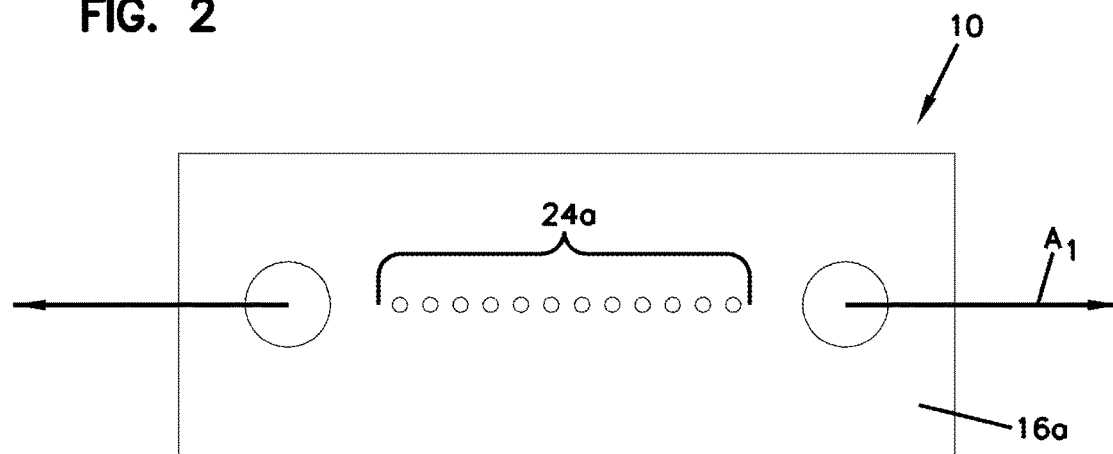
FIG. 2 is a cross-sectional view of the multi-fiber optic ferrule of FIG. 1, as viewed along sight line A.

Referring to FIG. 2, in some aspects the fiber passages 20a, 20b may be arranged in a row that extends along a major axis $A_1$ of the contact face 16a, 16b. In some aspects there may be multiple rows of fibers. The female ferrule 10 and the male ferrule 12 each may include a plurality of optical fibers 14a, 14b that extend through the fiber passages 20a, 20b. Example optical fibers 14a, 14b include material (e.g., a glass core surrounded by a glass cladding layer) that transmits optical information/signals.

As depicted, the optical fibers 14a may include an end face 24a that is accessible at the contact face 16a at the front end 18a of the female ferrule 10. The same can be said of the male ferrule 12. In use, the example optical fiber end faces 24a, 24b (not shown) may contact each other to transmit optical signals between the optical fibers 14a, 14b.

In some implementations, the female ferrule 10 and the male ferrule 12 each may define a pair of alignment pin openings 26a, 26b (see FIG. 1). In some aspects, the alignment pin openings 26a, 26b may extend rearwardly from contact face at the front end 18a, 18b of the female and male ferrules 10, 12. As depicted, the optical fibers 14a, 14b of each female and male ferrule 10, 12 may be positioned between each pair of alignment feature openings 26a, 26b.

In some implementations, the male ferrule 12 may include a pair of alignment pins 28, for example a pair of alignment pins 28 with distal point contacts 30 that can be rounded distal tips, and proximal base end portions 32 positioned and supported within the alignment pin opening 26b. The proximal base end portions 32 may be permanently secured within the alignment pin openings 26b.

Figure 3:
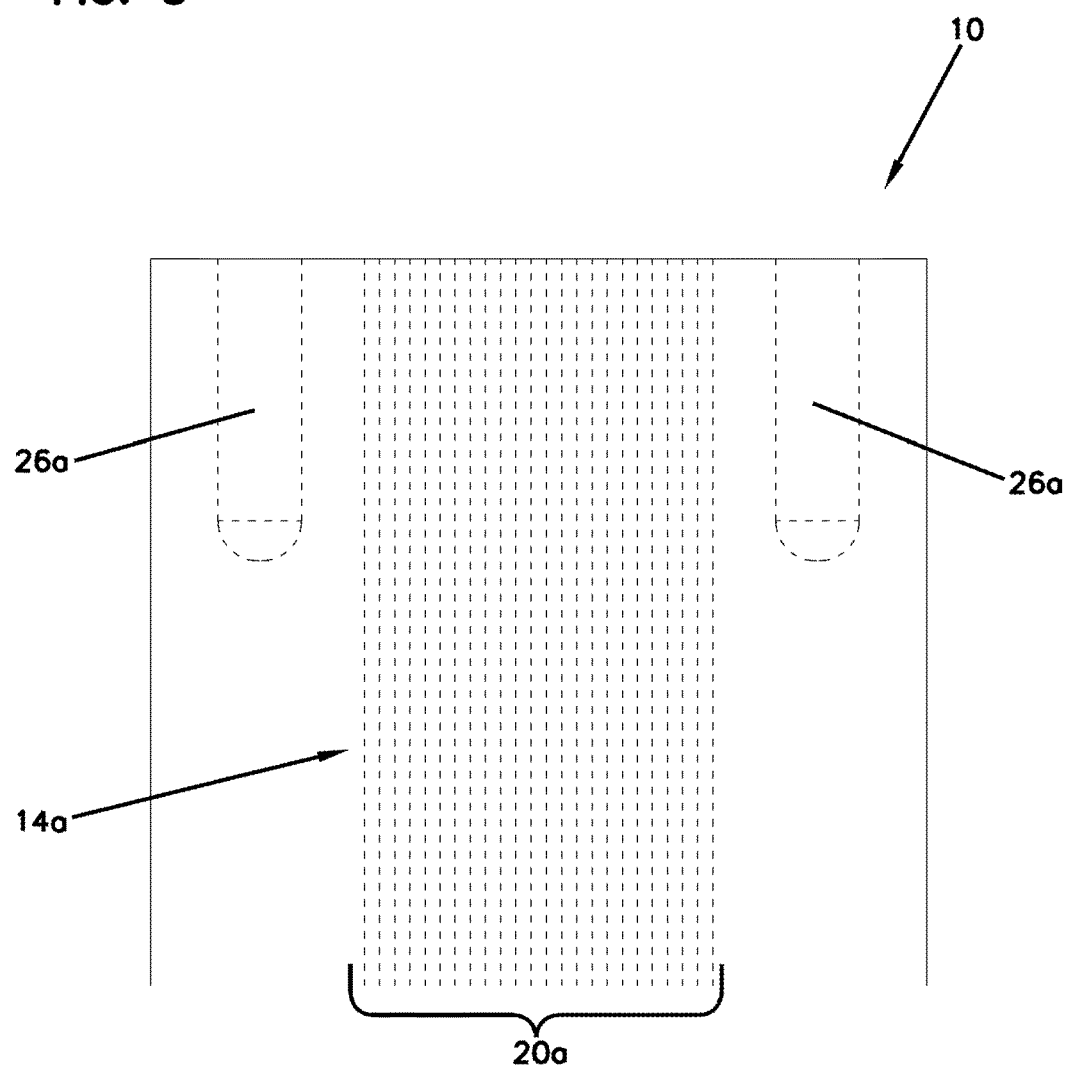
FIG. 3 is a side view of the female multi-fiber ferrule shown in FIG. 1.

Referring to FIG. 3, a side view of the female multi-fiber ferrule 10 is depicted. The optical fibers 14a can be potted within the fiber passages 20a. In one example, the optical fibers 14a are potted within the fiber passages 20a by bonding the optical fibers 14a within the fiber passages 20a using an adhesive such as epoxy.

Figure 4:
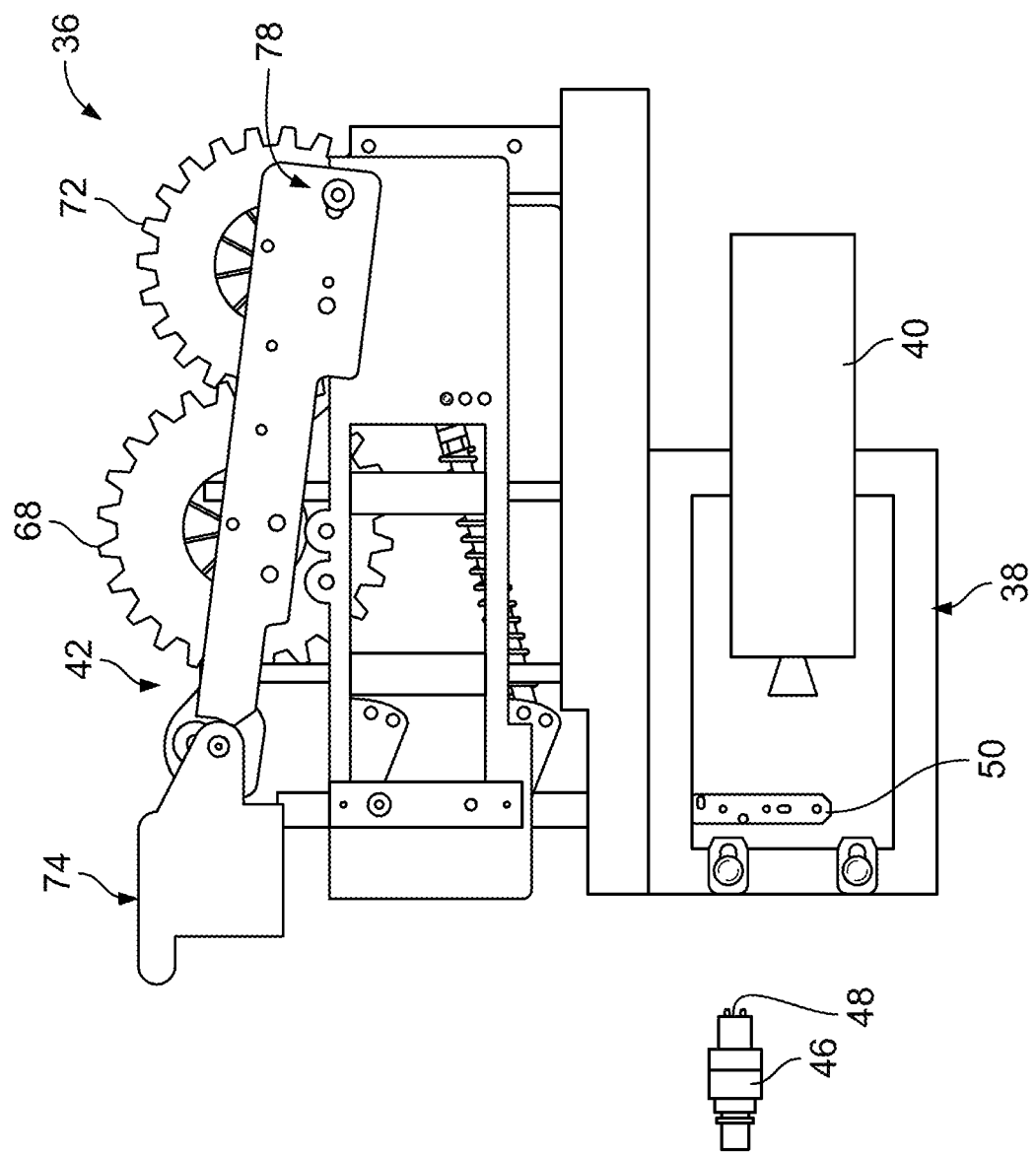
FIG. 4 is an example apparatus including a tape application station in accordance with principles of the present disclosure.
Figure 5:
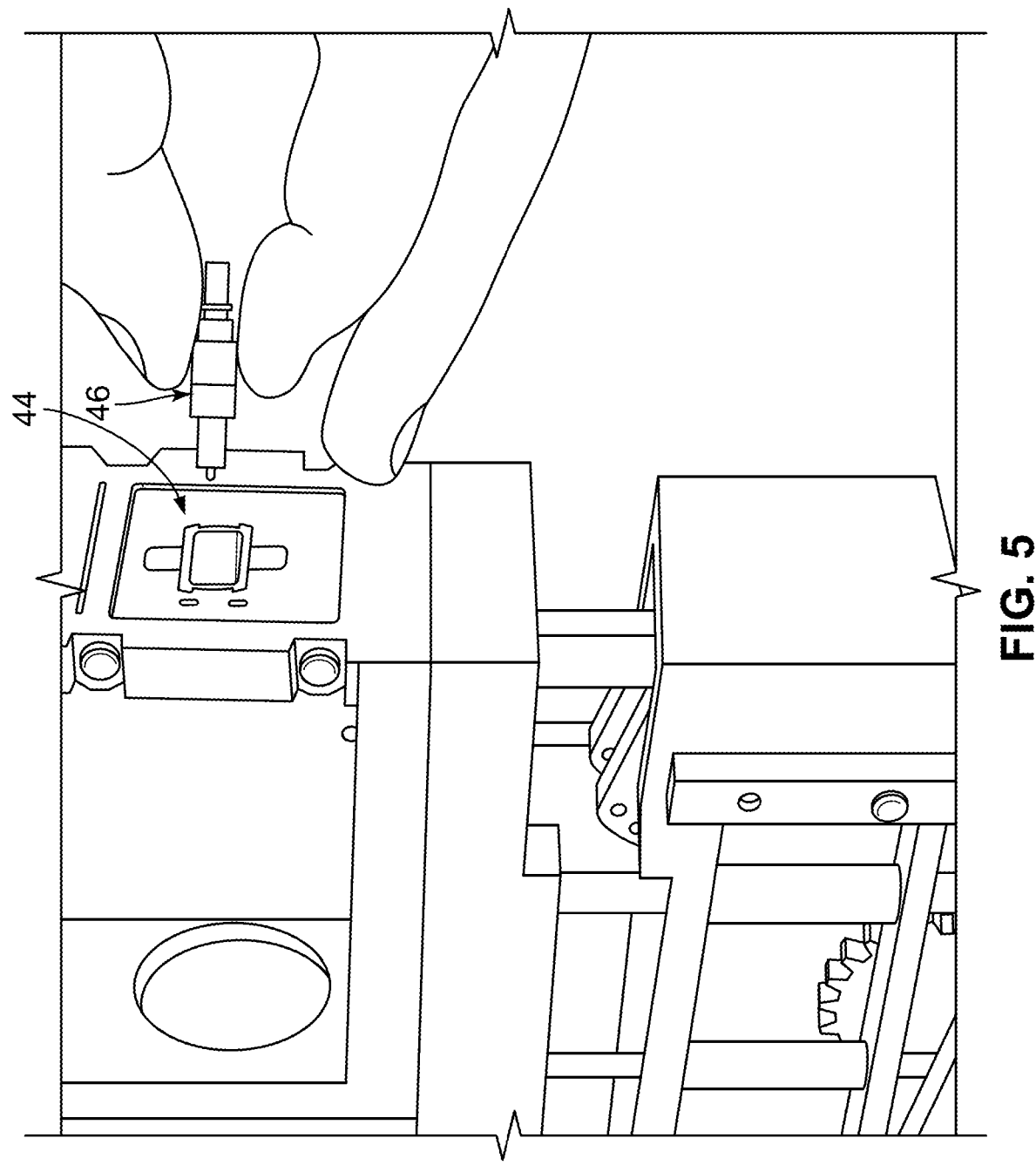
FIG. 5 is an end view of the apparatus shown in FIG. 4.

Referring to FIGS. 4-5, an example apparatus 36 for applying a strip of tape (e.g., tape member, cover, or protective sheeting) on an end face of a ferrule is shown. The apparatus 36 can include an inspection device 40 (e.g., microscope) with a housing 38 and a tape application station 42 including a mechanism for dispensing tape.

The housing 38 can help to limit access of loose particles such as dust or debris into the housing 38. Thus, the end face of the ferrule is prevented from being exposed to debris within the housing 38. In some aspects, a blower (not shown) may be used to continuously circulate air within the housing 38 to help keep the housing clean. The blower creates positive pressure within the housing 38 as compared to atmospheric pressure so that dust is prevented from entering. It draws air into the housing chamber through an air intake filter. The blower causes a continuous flow of air to exit the housing chamber through the opening for receiving the fiber optic connector (i.e., the adapter port 44). It can also blow dust off an end face of a ferrule of a connector.

The housing 38 can define an adapter port 44 (see FIG. 5) for receiving an example ferrule connector 46 (e.g., fiber optic connector). The ferrule connector 46 may be pushed into the adapter port 44 to snap therein such that an end face 48 of the ferrule connector 46 projects within the housing 38 for inspection. Once the ferrule connector 46 is inserted into the port 44 of the housing 38, end face 48 is exposed to the inspection device and is ready for inspection.

In the depicted example, a portion of the inspection device 40 is positioned within the housing 38. The inspection device 40 is a non-physical contact device that allows for magnified viewing of the end face 48 of the ferrule connector 46. The inspection device can include a microscope having a lens that co-axially aligns with the ferrule of the ferrule connector 46 when mounted at the adapter port 44 so that the end face 48 can be readily viewed for visual inspection.

The example tape application station 42 can include a plunger 50 that is located within the housing 38 of the apparatus 36. The plunger 50 can be arranged and configured to apply a tape member 52 (see FIG. 6) to the end face 48 of the ferrule connector 46 directly inside the housing 38 of the inspection device 40 to help limit contamination. Details of the tape application station 42 and the plunger 50 will be described in more detail with reference to FIGS. 4, 9, and 10.

Figure 6:
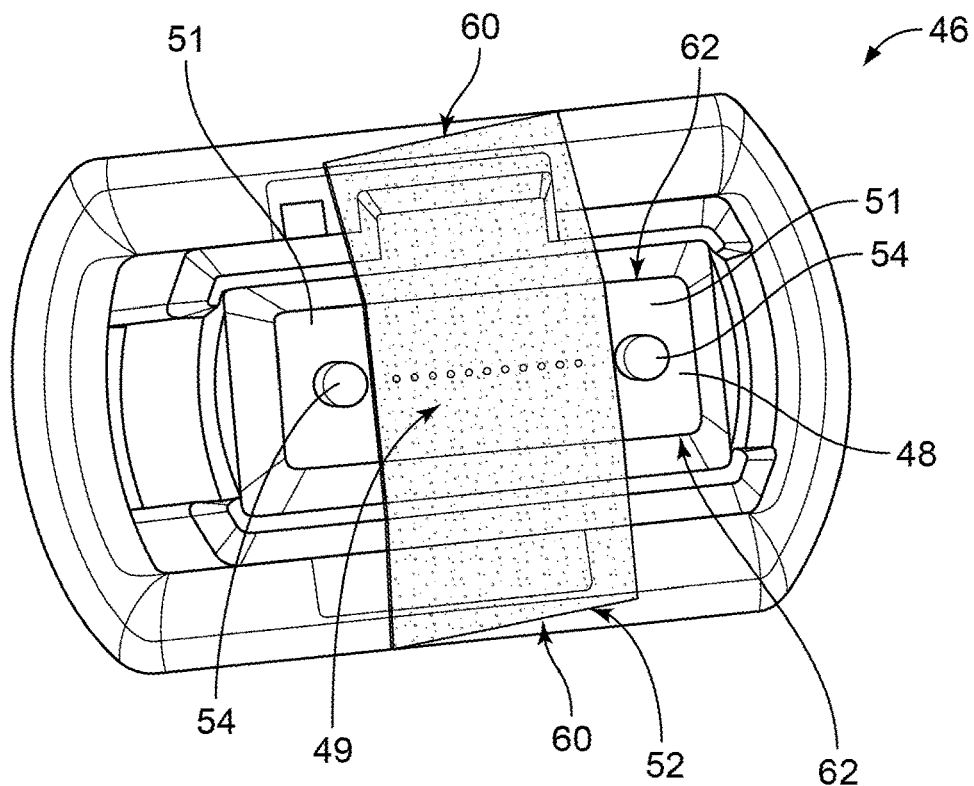
FIG. 6 is an end view of another ferrule connector with a tape member applied with a method in accordance with principles of the present disclosure.

In the depicted example, the ferrule connector 46 can be either male or female. As shown in FIG. 6, the ferrule connector 46 is male having pins 54 projecting from recessed guide pin holes. The same tape application station 42 can be used for both male and female connectors because the tape member 52 is not needed for the recessed areas including the pins 54. In other words, the whole end face 48 of the ferrule connector 46 does not need to be covered which could otherwise pose a challenge with the male connectors having the pins 54. While a multi-fiber connector is depicted, the same principles can be applied to a single fiber connector.

Figure 7:
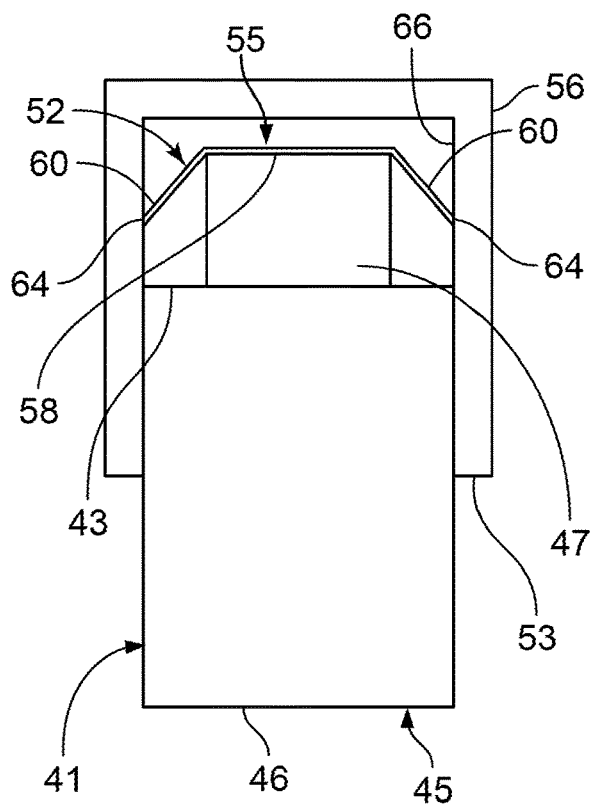
FIG. 7 is a schematic side view of the ferrule connector shown in FIG. 6.

Referring to FIG. 7, a side schematic view of the example ferrule connector 46 including a dust cap 56 thereon is depicted. The ferrule connector 46 can have a connector body 41 with a front end 43 and a back end 45. A ferrule 47 can be positioned at the front end 43 of the connector body 41. The ferrule 47 can have a distal end face 48 (see FIG. 6) with a central region 49 and recessed regions 51 on opposite sides of the central region 49. The ferrule 47 can hold optical fibers having a polished end face positioned at the central region 49 of the distal end face 48 of the ferrule 47. In other aspects, the end face of the ferrule 47 can have an angled polish so that the surface between the recessed regions 51 and the pins 54 where the fibers pass through is angled.

The dust cap 56 has an open end 53 and an opposite closed end 55. The closed end 55 of the dust cap 56 opposing the polished optical fiber end faces 24*a*.

The optical fiber end face 58 of the ferrule connector 46 is covered or protected by the tape member 52 at the central region 49. The tape member 52 can be applied between the pins 54 such that the tape member 52 has end edges 60 that hang over longitudinal sides 62 of the end face 48 of the ferrule connector 46.

In one aspect, the tape member 52 can be engineered to be constructed with a desired thickness, hardness, and size. The dust cap 56 can be applied over the ferrule connector 46 such that the end edges 60 of the tape member 52 flex downwardly as the dust cap 56 is secured thereon. The tape member 52 is flexible enough that it flexes along its length when the dust cap 56 is inserted over the ferrule connector 46 and side walls 66 of the dust cap 56 engage the end edges 60 of the tape member 52, but stiff enough that the end edges 60 dig into or embed in the side walls 66 of the dust cap 56 (which can be made of a rubber material) when the dust cap 56 is removed from the ferrule connector 46. Thus, the tape member 52 can stay mechanically fixed (e.g., locked, coupled, attached) with respect to the dust cap 56 when the dust cap 56 is removed from the ferrule connector 46.

The configuration of the tape member 52 inside the dust cap 56 can allow the tape member 52 to be simultaneously released from the optical fiber end face 58 as the dust cap 56 is removed. In other examples, the dust cap 56 can include a pre-applied pressure sensitive adhesive on the side walls 66 thereof such that the tape member 52 adheres to the dust cap 56 when placed over the ferrule connector 46. The pre-applied pressure sensitive adhesive can have a higher bond strength than the tape member 52 so that the tape member 52 is removed with the removal of the dust cap 56.

In other aspects, the tape member 52 can be configured to remain in place when the dust cap 56 is removed. The tape member 52 can be configured to attach to a variety of dust caps without any special design requirement. For example, tape can be fixedly attached within a cylindrical dust cap adapted to cover a single fiber ferrule. The tape can be affixed at a base end of the cylindrical dust cap using an attachment technique that allows the tape to be carried with the dust cap when the dust cap is removed from a ferrule. The tape can be pre-mounted in the dust cap so that the tape is applied to an end face of the ferrule when the dust cap is inserted over the ferrule. In one aspect, the tape member 52 can include a coloring agent for easy identification. The tape member 52 may also be transparent to be able to see through it for inspection of, for example, air bubbles.

Turning to FIG. 4 again, the tape application station 42 can include a supply spool 68 (e.g., feel roller) that has a film 82 (see FIG. 9) including a backing sheet 70 (e.g., liner) with individually cut pieces of the tape member 52 thereon, a rewind spool 72 (e.g., rewind roller) for collecting the backing sheet 70, and an actuator 74 for advancing the supply spool 68, and the plunger 50 that is arranged and configured to apply the cut tape member 52 onto the optical fiber end face 58 of the ferrule connector 46.

In one example, the tape member 52 can be die cut or mechanically cut inside the apparatus 36 in line into separate pieces on the backing sheet 70. Other cutting mechanisms may be used, such as, but not limited to, laser cutting, etching. In other examples, the tape member 52 can be cut separately outside of the tape application station 42.

In use, the actuator 74 can be pushed down automatically or manually to pivot about one or more pivot points which pushes the plunger 50 up and down. As the actuator 74 is pressed, it can advance the supply spool 68 and the plunger 50, including the film 84, can be forced downward into a plunged position (see FIG. 10). In the plunged position, the plunger 50 may be indexed to apply the tape member 52 directly onto the optical fiber end face 58 of the ferrule connector 46. After the tape member 52 is applied, the plunger 50 can then be raised upward in a raised position (see FIG. 9) and the cycle repeated.

Figure 8:
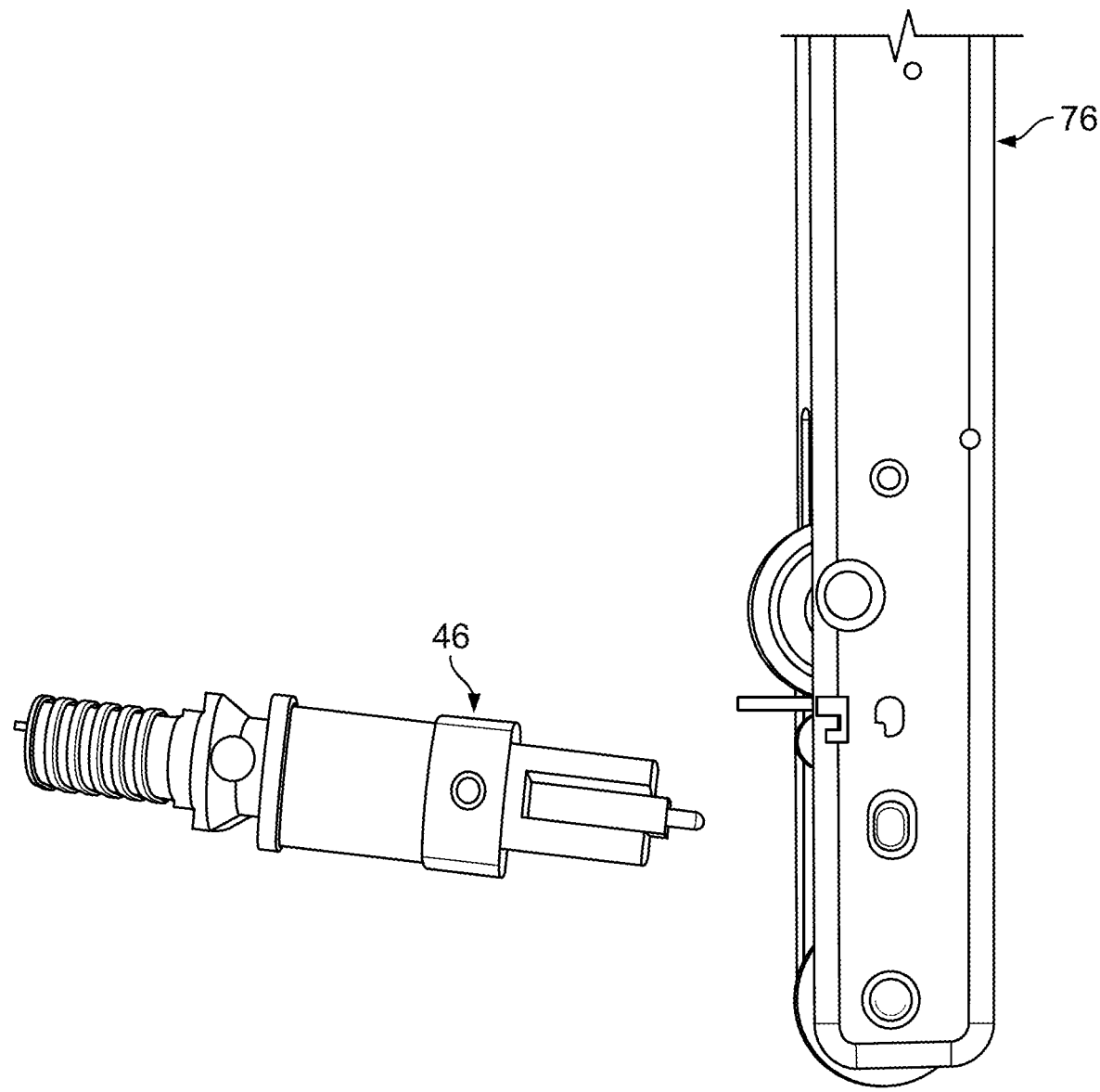
FIG. 8 is a partial view of the apparatus shown in FIG. 4 depicting the tape application station and a ferrule.

FIG. 8 is an exploded view of the tape dispenser 50 shown in FIG. 4. In one aspect, the plunger 50 can include a frame 76. The plunger 50 can include a tape application arrangement 90 as shown in FIGS. 9 and 10.

Figure 9:
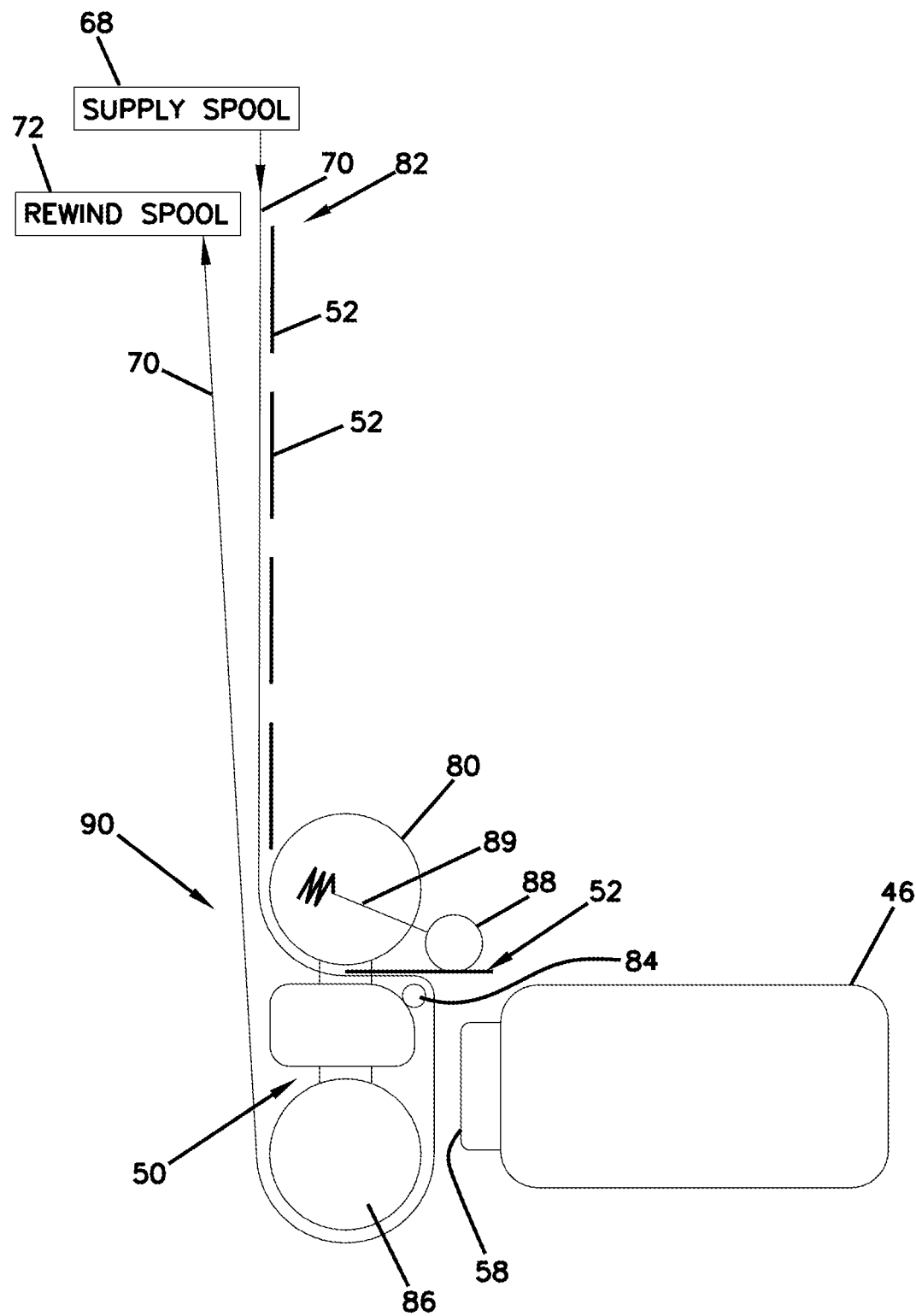
FIG. 9 is a schematic view of a mechanism incorporated in the tape application station shown in a raised position in accordance with principles of the present disclosure.
Figure 10:
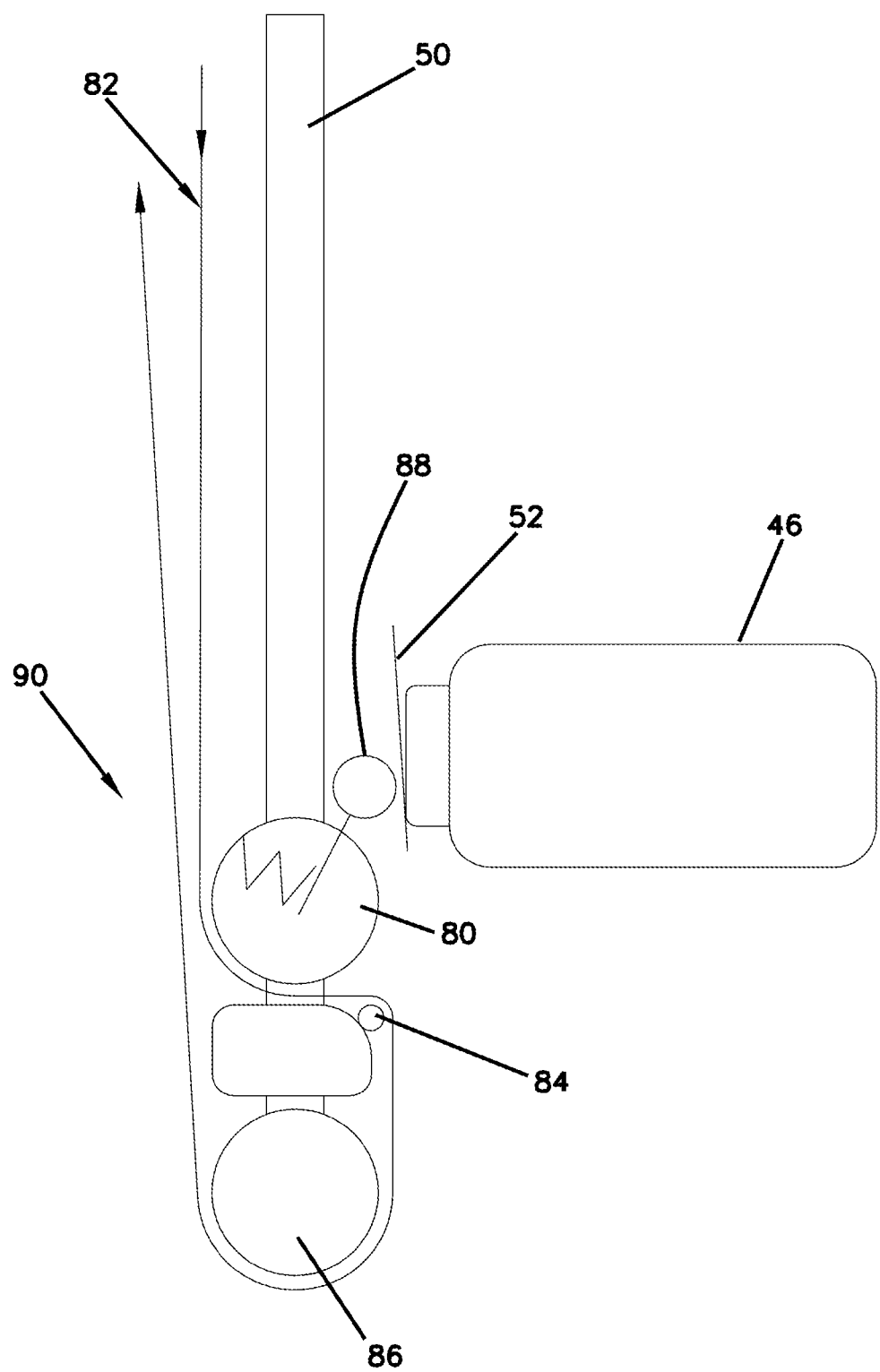
FIG. 10 is a schematic view of the mechanism shown in FIG. 9 in a plunged position in accordance with principles of the present disclosure.

FIGS. 9 and 10 depict an example mechanism for the tape application arrangement 90 that can be incorporated inside the plunger 50. It will be appreciated that other arrangements may be used. In FIG. 9, the plunger 50 is schematically shown in a raised position. The supply spool 68 is shown supplying the film 82 with the backing sheet 70 and cut pieces of the tape member 52 thereon. The film 82 can be feed through the tape dispenser 50 and a guide roller 80 may be used to help guide the film 82 therethrough. In the tape application arrangement 90, the film 82 can be routed through the tape dispenser 50 over a tight radius roller 84. The tight radius roller 84 can have a bend radius small enough such that the tape member 52 separates from the backing sheet 70 as it moves around. The tight radius roller 84 can be referred to a tape separation structure and can be a roller or other structure having as tight bend or profile suitable for causing the tape to unpeel/disengage from the backing sheet 70. A return roller 86 can be used to return the backing sheet 70 back to the rewind spool 72.

FIG. 10 is a schematic view of the plunger 50 in the plunged position. A spring loaded roller 88 (i.e., tape press roller or other pressing structure) is shown on an arm 89 to press the tape member 52 on the optical fiber end face 58 of the ferrule connector 46. As shown, the spring loaded roller 88 presses against the tape member 52 and rolls thereon as the plunger 50 is raised. In other embodiments, the press roller does not have to be on an arm or be spring loaded to apply the tape member 52.

The present disclosure also relates to a method of applying a tape member to an end face of a ferrule connector positioned inside a housing of an inspection device, the housing of the inspection device having an integrated tape dispensing mechanism therein. The method can include the steps of inspecting an end face of the ferrule connector within the housing of the inspection device and applying the tape member over the end face of the ferrule connector within the housing of the inspection device.

From the forgoing detailed description, it will be evident that modifications and variations can be made without departing from the spirit and scope of the disclosure.

What is claimed is:

1. A fiber optic connector assembly comprising:
   a fiber optic connector having a connector body with a front end and a back end;
   a ferrule positioned at the front end of the connector body, the ferrule having a distal end face with a central region and recessed regions on opposite sides of the central region, the ferrule holding an optical fiber having a polished end face positioned at the central region of the distal end face of the ferrule;
   a dust cap adapted to mount on the ferrule, the dust cap having an open end and an opposite closed end, the closed end of the dust cap being configured to oppose the polished end face of the optical fiber; and
   a tape member covering the central region of the ferrule such that end edges of the tape member hang over longitudinal sides of the distal end face of the ferrule, while the dust cap is being inserted over the fiber optic connector, the end edges of the tape member are adapted to flex downwardly to secure to side walls of the dust cap such that, as the dust cap is removed, the tape member simultaneously comes off with the dust cap.

2. The fiber optic connector assembly of claim 1, wherein the tape member contains a coloring agent.

3. The fiber optic connector assembly of claim 2, wherein the tape member is transparent.

4. The fiber optic connector assembly of claim 1, wherein the dust cap has side walls that extend from the open end to the closed end of the dust cap.

5. The fiber optic connector assembly of claim 1, wherein the end edges of the tape member are configured to embed in the side walls of the dust cap.

6. A fiber optic assembly comprising:
   a fiber optic connector comprising a ferrule, the ferrule supporting an optical fiber extending therethrough to a distal end face of the ferrule;
   a dust cap adapted to mount over the ferrule, the dust cap having an open end and an opposite closed end, the closed end opposing the distal end face of the ferrule; and
   a tape cover adhered directly to the distal end face of the ferrule such that end edges of the tape cover hang over longitudinal sides of the distal end face of the ferrule, while the dust cap is being inserted over the fiber optic connector, the end edges of the tape cover are adapted to flex downwardly to attach to side walls of the dust cap such that the tape cover is simultaneously released with the dust cap as the dust cap is removed.

7. The fiber optic assembly of claim 6, wherein the tape cover contains a coloring agent and is transparent.

8. The fiber optic assembly of claim 6, wherein the end edges of the tape cover are configured to embed in the side walls of the dust cap.

* * * * *